UNITED STATES PATENT OFFICE.

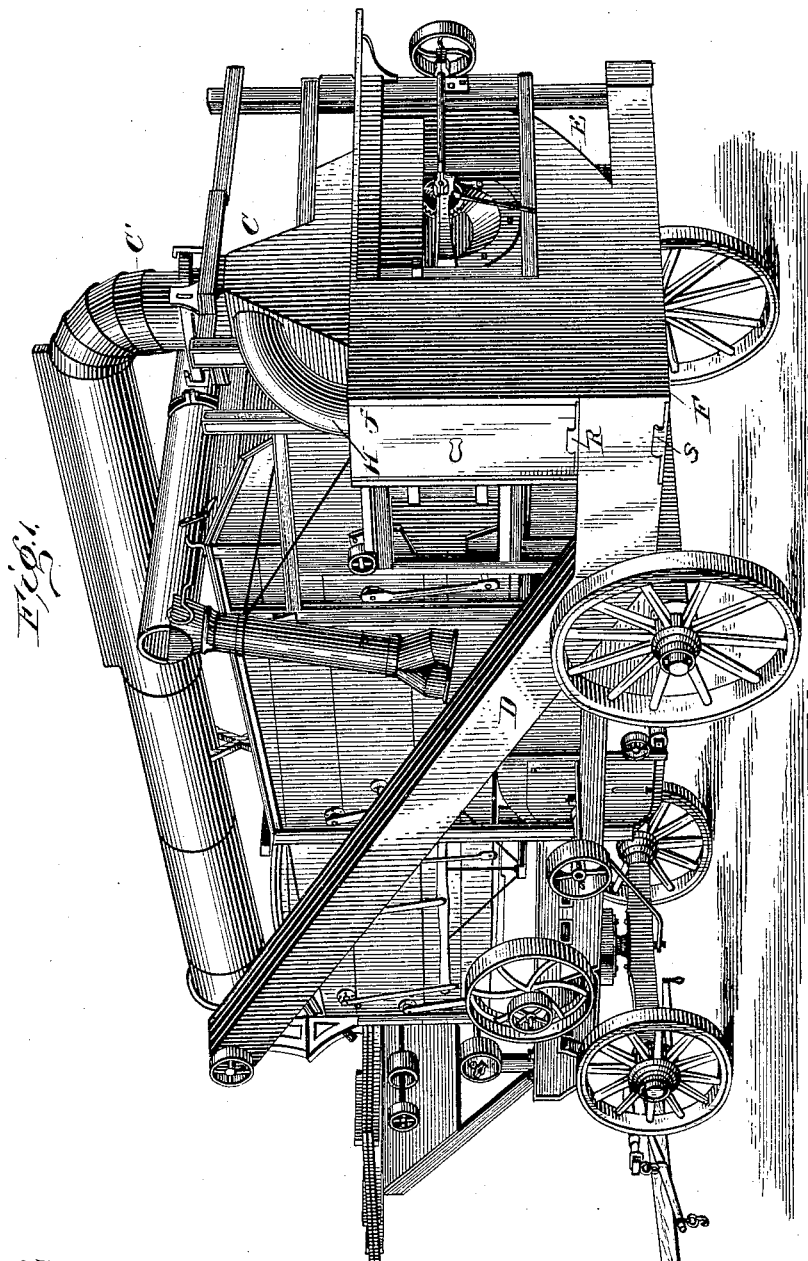

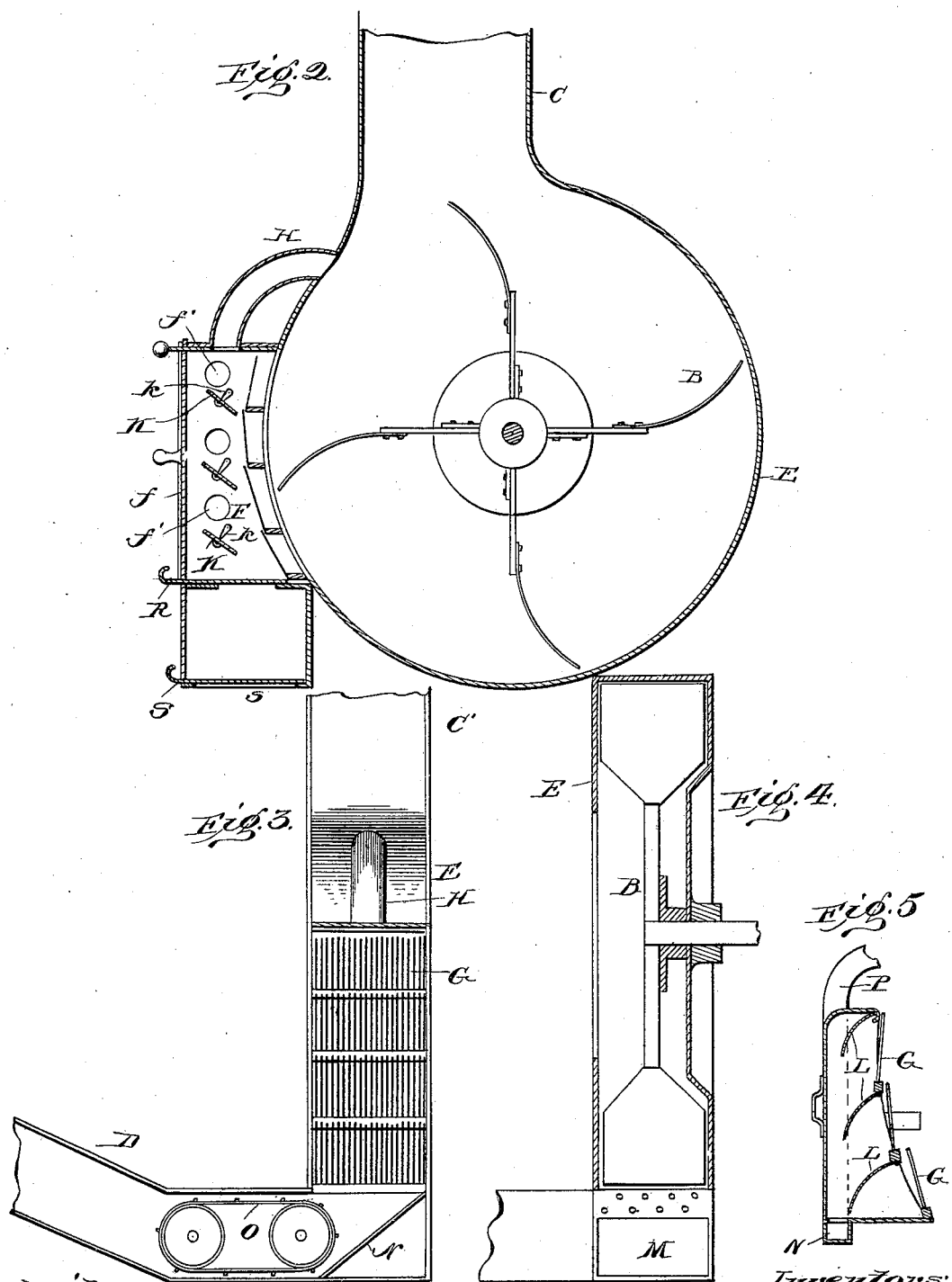

MORGAN P. HALL, OF GRAYVILLE, ILLINOIS, AND DANIEL HEILMAN, OF EVANSVILLE, INDIANA; SAID HEILMAN ASSIGNOR TO GEORGE D. HEILMAN, OF EVANSVILLE, INDIANA.

THRESHING-MACHINE.

SPECIFICATION forming part of Letters Patent No. 611,903, dated October 4, 1898.

Application filed February 19, 1898. Serial No. 670,956. (No model.)

*To all whom it may concern:*

Be it known that we, MORGAN P. HALL, of Grayville, in the county of White and State of Illinois, and DANIEL HEILMAN, of Evansville, in the county of Vanderburg and State of Indiana, have invented certain new and useful Improvements in Threshing-Machines; and we do hereby declare the following to be a full, clear, and exact description of the same, reference being had to the accompanying drawings, forming part of this specification, and to the letters of reference marked thereon.

This invention relates to threshing-machines, and particularly to that type in which an exhaust-fan is arranged vertically at the outlet of the threshing-machine, so as to receive the straw and chaff in its eye and discharge the same through a stacking-pipe; and the invention has for its object to provide an improved grain-saving device for use in connection with such threshing-machines, whereby the grain which has passed through the machine by accident in a separated state, or which has passed through the machine without being separated from the heads and is separated by the action of the vanes or blades of the fan, may be saved and treated with the body of grain discharged from the threshing-machine proper.

Referring to the accompanying drawings, Figure 1 is a perspective view of a threshing-machine of the type mentioned having our invention applied thereto. Fig. 2 is a vertical transverse section through the fan and supplemental separator shown in Fig. 1. Fig. 3 is a side elevation with the casing elevated and showing the screens and supplemental conveyer for carrying the saved grain to the main elevator. Fig. 4 is a horizontal section through the stacker-fan and supplemental separator, and Fig. 5 is a sectional view through a modified form of supplemental separator detached and showing fixed deflectors.

Like letters of reference in the several figures indicate the same parts.

The threshing-machine proper is indicated by the letter A in the accompanying drawings, and to its rear end there is attached a fan-casing for a rotary stacking-fan B, the casing terminating at the top in a converging trunk C and pipe C', through which the straw and chaff are discharged to the stack. At the side of the machine is the usual elevator D for raising the grain separated from the chaff and straw to the top of the machine for future manipulation.

In carrying our present invention into practice the fan-casing E is provided at one side with an enlargement or chamber F, the communicating opening between this chamber F and the fan-casing E being bridged by a screen or series of screen-sections G, Figs. 2 and 3, for preventing any of the larger portions or masses of the straw and chaff from entering said chamber F, but at the same time permitting the small and heavier particles to be forced into said chamber by the natural centrifugal action of the air when the fan is rotated. The chamber F forms to a certain extent an eddying or dead-air chamber, through which a moderate current of air is caused to pass and escape through a branch pipe H, connecting the top of the chamber and discharge of the fan-casing. The result of this arrangement is that heavy particles driven through the screens G will be permitted to drop to the bottom of the chamber F, while the lighter particles will be carried off through the branch pipe H, and hence the grain which has passed through the thresher proper in a free state, or which has been separated from the heads by the beating action of the fan, will be carried into said chamber F and allowed to drop to the bottom thereof. The chamber F may be and preferably is provided with a series of adjustable deflectors K, which may, by means of handles k, be turned to a greater or less angle for deflecting the grain or chaff and securing a correct action when the grain varies in weight—for instance, when the grain is wet or dry. In lieu of adjustable deflectors, fixed deflectors L— such, for instance, as shown in Fig. 5—may be employed, and hence in this particular we do not wish to be limited. The casing F may be provided on its outer edge with a door or movable section *f*, through which the interior of the casing may be reached for cleaning or other purposes, and in addition the side wall of the casing may be provided with glazed windows $f'$ for inspecting the interior and determining the proper angle at which the deflectors should be set.

The bottom of the casing F may terminate in a hopper M, at one side of which a chute or trough N, Fig. 3, is arranged to communicate with the main elevator of the threshing-machine, and, if desired, a supplemental conveyer O, Fig. 3, may be located in this passage to carry the saved grain from the casing F and hopper M to the main elevator.

The bottom of the casing F or the hopper M and passage N may also be in communication through a pipe P, Fig. 5, with the outlet of the exhaust or stacking fan, so as to create a draft over and through the body of grain which has dropped to the bottom of the casing F, and thus in a large measure remove any of the chaff or straw which has through accident fallen down with the saved grain.

Obviously the invention may be applied to any threshing-machine of this class, and we do not wish to be limited to the particular style of threshing-machine illustrated.

Where it is desired to discharge the saved grain separate from the bulk of the grain or into independent sacks, this may be accomplished by arranging two slides R and S in the bottom of the chamber F to form a cut-off for closing a bottom opening $s$, beneath which the sacks may be held to receive the grain.

Having thus described our invention, what we claim as new, and desire to secure by Letters Patent, is—

1. The combination with a threshing-machine and a stacking-fan at the outlet thereof, having a straw and chaff discharge, of a supplemental chamber communicating with the fan-chamber, a screen interposed between the fan and chamber, a grain-receiver at the bottom of said chamber and an outlet from said chamber into the discharge-opening of the fan-casing; substantially as described.

2. The combination with a threshing-machine and a stacking-fan arranged at the discharge thereof and having a stacking-pipe communicating therewith, of a supplemental chamber at one side of the fan-casing, a screen interposed between the fan and said supplemental chamber, a discharge-outlet for said supplemental chamber, deflectors arranged within said chamber opposite the screened opening thereto and a grain-receiver at the bottom of said chamber; substantially as described.

3. The combination with a threshing-machine, a transversely-arranged stacking-fan at the rear end of said machine, a casing inclosing said fan and terminating at the top in a stacking-pipe, of a supplemental chamber arranged at one side of the fan-casing, screen-sections interposed between the supplemental chamber and fan, deflectors within the supplemental chamber, a pipe leading from the supplemental chamber into the discharge-passage of the fan-casing, a grain-receiver at the bottom of the supplemental chamber and a supplemental conveyer for removing the grain from the receiver; substantially as described.

4. The combination with a threshing-machine, a stacking-fan having an inclosing casing located at the rear end of the thresher and a stacking-pipe communicating with said fan-casing, of a screened aperture in the side wall of said casing, a supplemental chamber surrounding said screened opening, a series of adjustable deflectors located within said chamber in line with the screened opening, a grain-discharge opening in the bottom of said chamber and an air and chaff discharge opening leading from said chamber into the discharge-passage of the fan-casing; substantially as described.

MORGAN P. HALL.
DANIEL HEILMAN.

Witnesses:
LOUIS I. OHLERING,
GEO. D. HEILMAN.